Douglas & Ingler,
Lubricator.

Nº 64,646.        Patented May 14, 1867.

Witnesses
J. A. Service

Inventors;
William Douglass
H. M. Ingler
Per Munn & Co.
Attys.

United States Patent Office.

WILLIAM DOUGLAS AND HIRAM M. INGLER, OF BELLAIR, OHIO.

Letters Patent No. 64,646, dated May 14, 1867.

---

IMPROVEMENT IN OIL-CUP FOR MACHINERY.

---

The Schedule referred to in these Letters Patent and making part of the same.

---

TO ALL WHOM IT MAY CONCERN:

Be it known that we, WILLIAM DOUGLAS and HIRAM M. INGLER, of Bellair, in the county of Belmont, and State of Ohio, have invented a new and useful Improvement in Oil-Cups; and we do hereby declare that the following is a full, clear, and exact description thereof, which will enable those skilled in the art to make and use the same, reference being had to the accompanying drawings, forming part of this specification.

Our invention consists in so constructing an oil-cup that the oil that reaches the wrist-pin or journal, shall be discharged upward by the motion of the cup on the crank through a hole so small that the quantity discharged shall only be sufficient to lubricate the wrist for which it is intended. In the accompanying drawings—

Similar letters of reference indicate corresponding parts.

Figure 1:
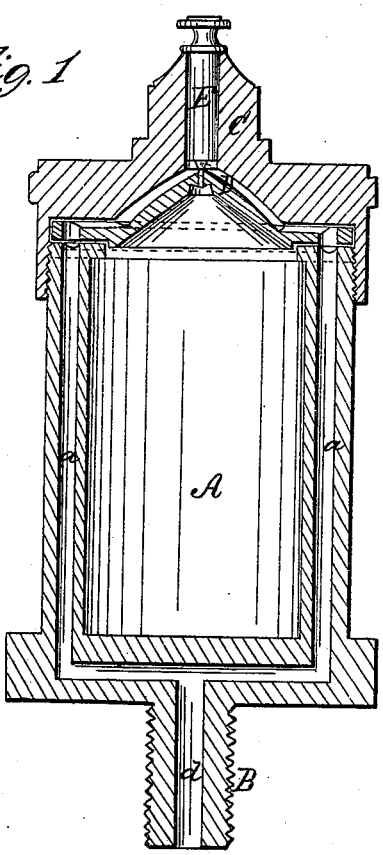
Figure 1 represents a vertical section of our oil-cup.
Figure 2:
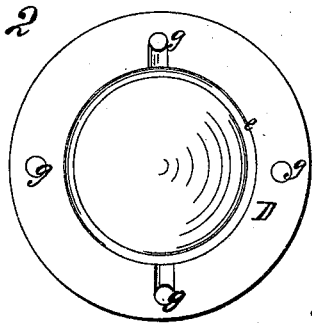
Figure 2 is a top view of the oil-feeder.

A is the cup containing the oil; B is the screw or neck by which it is attached to the crank; C is the cap of the oil-cup; D is the conical oil-feeder; E is the stopper in the centre of the cap; $a\,a$ are apertures through the shell or sides of the cup to convey the oil from the feeder and from the cap to the wrist-pin. The cup is formed, as represented in the drawing, with a neck, B, by which it is attached to the crank of the engine. The space A contains the oil. The holes $a\,a$ communicate with the wrist-pin through the hole $d$ in the neck. The feeder D is a loose conical piece laid on the top of the cup A. The upper side of it is conical, as seen in the drawing. At the base of the cone there is a channel, $e$, and near the outer edge there are holes $g$ to convey the oil from the feeder to the apertures $a\,a$. The channel $e$ and the holes $g$ communicate with each other, the upper part of the holes being slotted to the channel. There are holes $g'$ through the feeder for two guide-pins which are in the cap C. These pins enter the holes and keep the feeder in such a position that the oil-holes through it and the holes $a\,a$ in the cup correspond. Through the apex of the cone there is a small hole, through which the oil is thrown in small quantities when the crank is in motion. The oil thus thrown through the small hole runs down the sides of the cone into the channel $e$, and through the holes $g$ and $a\,a$ and $d$ to the wrist-pin. By this arrangement the small hole in the cone-feeder is always kept open and clear by the force of the oil in the cup while the engine is in motion, as the oil is violently thrown upward at every revolution, while any sediment or foreign substances would be likely to remain near the bottom of the cup. By means of the hole through the cap C we are able to lubricate the pin directly in case of necessity, as oil poured into this hole reaches the wrist-pin immediately. The cap is screwed on to the cup as seen in the drawing, and the cone-feeder D is confined between the two.

Having thus described our invention, what we claim as new, and desire to secure by Letters Patent, is—

The cone-feeder D, constructed and arranged substantially as described, for the discharge of the oil upward by the motion of the engine-crank.

We claim the arrangement, substantially as herein described, for oiling the wrist-pin directly in combination with an upward-feeding oil-cup.

WILLIAM DOUGLAS,
HIRAM M. INGLER.

Witnesses:
M. W. JENKINS,
B. R. COWEN.